United States Patent [19]
Goto et al.

[11] Patent Number: 4,830,077
[45] Date of Patent: May 16, 1989

[54] HEAVY DUTY PNEUMATIC TIRE HAVING ASYMMETRIC TREAD

[75] Inventors: Hisashi Goto, Kodaira; Osamu Inoue, Higashikurume, both of Japan

[73] Assignee: Bridgestone Corporation, Tokyo, Japan

[21] Appl. No.: 46,323

[22] Filed: May 6, 1987

[30] Foreign Application Priority Data

Jun. 17, 1986 [JP] Japan .................. 61-139286

[51] Int. Cl.⁴ .................. B60C 3/06; B60C 11/08
[52] U.S. Cl. .................. 152/209 A; 152/209 B; 152/454; 152/456
[58] Field of Search .......... 152/209 A, 209 B, 209 R, 152/454, 455, 456, 209 D

[56] References Cited

U.S. PATENT DOCUMENTS

| | | |
|---|---|---|
| 3,155,135 | 11/1964 | Klenk .................. 152/209 A |
| 3,231,000 | 1/1966 | Massoubre .................. 152/209 A |
| 3,286,756 | 11/1966 | Ellenreider et al. .................. 152/209 A |
| 3,410,329 | 11/1968 | Bezbatchenko, Jr. .................. 152/209 A |
| 3,554,259 | 1/1971 | Webb .................. 152/209 A |
| 3,880,218 | 4/1975 | Brajenovich .................. 152/209 R |

FOREIGN PATENT DOCUMENTS

147901 9/1982 Japan .................. 152/456
191402 8/1986 Japan .................. 152/209 A Primary Examiner—Michael W. Ball
Assistant Examiner—Geoffrey L. Knable
Attorney, Agent, or Firm—Sughrue, Mion, Zinn, Macpeak and Seas

[57] ABSTRACT

Heavy duty pneumatic tires having lug grooves at a tire tread surface are disclosed, wherein a width of a tread portion from a tire equator to one of tread edges which tread portion is to be located on a wheel-mounted outer side is larger than that of the other tread portion from the equator to the other tread edge. When contours of the tread portions located on the opposite sides of the tire equator are approximated by two respective circular arcs, the radius of curvature of the wider tread portion is larger than that of the narrower tread portion. A depth of grooves at the shoulder portion on the wider tread portion which depth is expressed by a distance between the tread edge and the bottom of the lug grooves is made smaller than that of the narrower tread portion.

4 Claims, 3 Drawing Sheets

HEAVY DUTY PNEUMATIC TIRE HAVING ASYMMETRIC TREAD

BACKGROUND OF THE INVENTION (1) Field of the Invention:

The present invention relates to heavy duty pneumatic tires, and more particularly the invention relates to attainment of both a block-chipping resistance and a traction performance of tires for rough road running, more specifically tires for wheel type loaders (hereinafter referred to as "wheel loader tires").

(2) Related Art Statement:

When wheel loader tires run on rough terrain, particularly on a rocky places, there often occur troubles called block-chipping in the case of laterally symmetrical tires shown in FIG. 2, that is. That a rubber is partially chipped at the tire surface from a tread portion to a shoulder portion on the surface outer side of the tire surface when the tire is mounted on a wheel (hereinafter referred to as "wheel-mounted outer side").

In order to prevent the block-chipping mentioned above, the rigidity of the tread on the wheel-mounted outer side has been increased by adopting a so-called semi-slick pattern. As shown in FIG. 3, grooves from the tread portion to the shoulder portion on the wheel-mounted outer side (on the left in FIG. 3) are diminished or the rigidity of the whole tread has been increased by adopting a so-called slick pattern in which all the grooves are diminished.

In the conventional countermeasures, the block-chipping resistance is largely improved by increasing the rigidity between the tread portion and the shoulder portion on the wheel-mounted outer side. However, since wheel loader tires run not only on hard and rough roads such as rocky places but also on relatively soft rough roads, traction performance, which is a force by which the tire grasps the road and drags a vehicle is required. In the case of tires having a semi-slick pattern or a slick pattern, the traction performance originating from the shearing resistance due to the pattern is greatly deteriorated so that a problem occurs that the tire is difficult to run on soft roads. Further, since the one side surface or the whole surface of the tread is designed as "slick", a greater amount of rubber is required for the tread and manufacturing cost unfavorably increases.

SUMMARY OF THE INVENTION

Under these circumstances, an object of the present invention is to provide wheel loader tires which can attain both the block-chipping resistance and the traction performance, and are less expensive.

According to the present invention, there is a provision of heavy duty pneumatic tires having lugs in a tire tread surface, in which a width of a tread portion from a tire equator to one of opposite tread edges in a radial section is made larger than that of the tread portion from the tire equator to the other tread edge; when the contours of the tread portions positioned on the opposite sides of the tire equator are approximated by two respective circular arcs, the radius of curvature of the wider tread portion is made larger than that of the narrower tread portion; a depth of grooves at the shoulder portion which is expressed by a distance from the tread edge to the bottom of the lug grooves is smaller at the wider tread portion than at the narrower tread portion; and the tire is mounted to a wheel such that the wider tread portion is located on the wheel-mounted outer side.

It is recommended as preferred embodiments that the width "$TW_A$" of the wider tread portion from the tire equator to the tread edge is not less than 1.05 times the width "$TW_O$" of the narrower tread portion; the radius of curvature, "$CR_A$", of the contour of the wider tread portion is not less than 1.2 times the radius of curvature, "$CR_O$", of the narrower tread portion; and the depth "$STD_A$" of the grooves at the shoulder portion which depth is expressed by an absolute distance from the tread edge to the bottom of the lug groove on the wider tread portion is from 0.5 to 0.9 time the depth "$STD_O$" of the grooves at the shoulder portion on the narrower tread portion.

By so constructing, according to the present invention, the block-chipping resistance can be improved without largely deteriorating the traction performance of the wheel loader tires.

These and other objects, features and advantages of the invention will be appreciated upon reading of the following description of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

Figure 2:
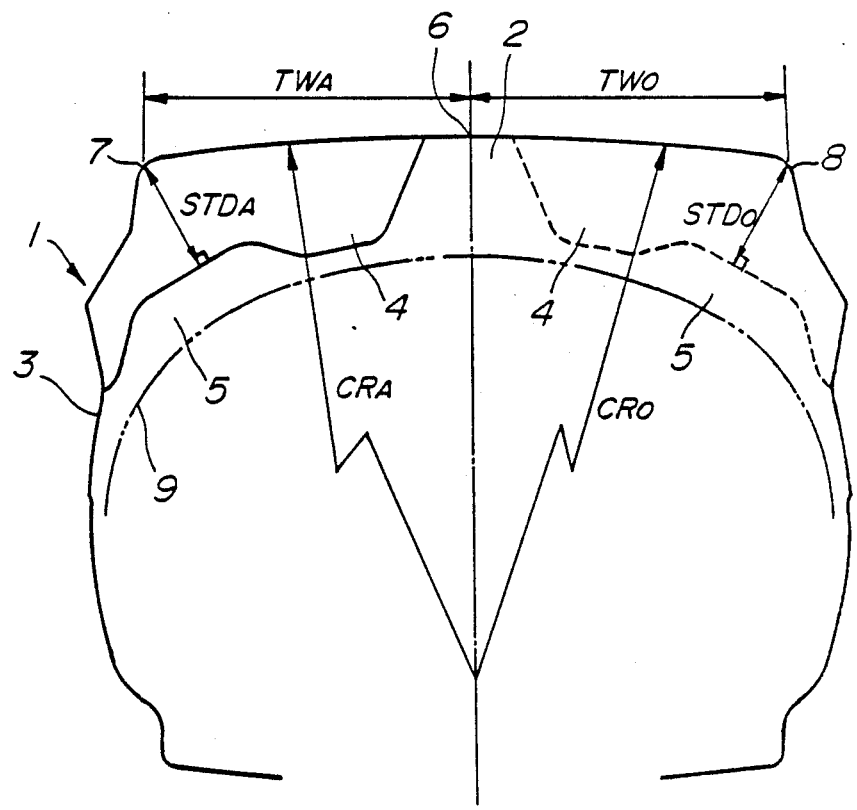
FIG. 2 is a radially sectional view of a prior art wheel loader tire.

For the purpose of the practical application, any heavy duty pneumatic tire is required to have at least 90% of the traction performance of tires having an ordinary tire profile as shown in FIG. 2. This is because when the traction performance is further deteriorated, the tire is difficult to run on relatively soft roads such as common construction work sites, etc. and practically unsuitable. Thus, lug grooves are provided over the entire tread surface according to the present invention. Further, since blocks are chipped concentrically on the tire half portion, that is, on the wheel-mounted outer side and no influence occurs on the other tire half portion, i.e. on the wheel-mounted inner side, the wheel-mounted inner side is designed in a common profile as shown in FIG. 2 to obtain the traction.

In order to improve the block-chipping resistance, it is necessary to increase the rigidity in an area from the tread portion to the shoulder portion on the wheel-mounted outer side. The rigidity is indeed improved by increasing the volume of the rubber. However, when the slick pattern is merely adopted, the volume of the rubber increases and the traction is deteriorated. For this reason, the volume of the rubber is increased by enlarging the tread width and the radius of curvature of the contour of the tread and shallowing the depth of the grooves at the shoulder portion.

Although to shallow the depth $STD_A$ of the grooves at the shoulder portion is most effective to increase the rigidity, too shallow grooves lead to deterioration of the traction performance. Therefore, it is preferable that the depth $STD_A$ is not less than 0.5 times the depth $STD_O$ of the grooves on the wheel-mounted inner side. On the other hand, if the depth is more than 0.9 times, the effect to increase the rigidity almost disappears. As understood from the above, since the grooves at the shoulder portion must be made to a certain depth under consideration of the traction performance, the rigidity in an area from the tread portion to the shoulder portion on the wheel-mounted outer side becomes insufficient for preventing the block chipping. To cope with this, the volume of the rubber is increased by enlarging the width of the tread portion and the radius of curvature of the tread contour from the tire equator to the tread edge on the wheel-mounted outer side, thereby improving the rigidity. Excellent effects are obtainable when the tread width $TW_A$ is not less than 1.05 times the other tread with $TW_O$ and the radius of curvature $CR_A$ of the tread contour is not less than 1.2 times that $CR_O$ of the other tread contour. Increases in the tread width and the radius of curvature do not significantly influence the traction performance.

The present invention will be explained in more detail with reference to the attached drawings.

Figure 1:
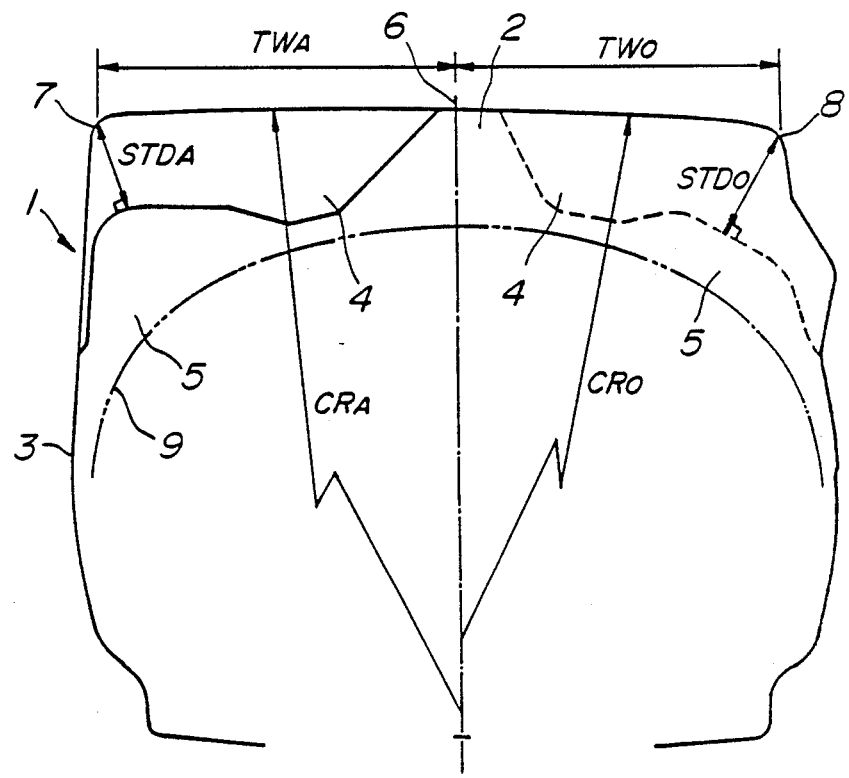
FIG. 1 is a radially sectional view of a tire according to the present invention.

The tire according to the present invention will be shown based on a tire size of 37.23-35 (TRA code L-5) in FIG. 1 by way of example. A tire 1 includes a tread 2 and side walls 3. The tread 2 has deep lug grooves 4, and is reinforced by hump portions 5. The width $TW_A$ of the tread portion from the tire equator 6 to one of the tread edges, 7, is wider than that $TW_o$ of the other tread portion from the tire equator to the other tread edge 8. The tire equator 6 conventionally defined as a line that exists in a plane that bisects the a line between tire beads, the equator extending in a direction perpendicular from the tire axis of rotation. The ratio of $TW_A/TW_O$ is preferably not less than 1.05, and 1.10 in the illustrated embodiment. The radius of curvature, $CR_A$, of the tread contour of the wider tread portion is larger than the radius of curvature, $CR_O$. The ratio of $CR_A/CR_O$ is not less than 1.2, and 1.4 in this embodiment. The depth of the grooves at the shoulder portion, $STD_A$, which is a distance from the tread edge 7 to the bottom of the lug groove on the wider tread portion is smaller than the depth, $STD_O$, of the grooves at the shoulder portion on the side of the tread edge 8. The ratio of $STD_A/STD_O$ is preferably 0.5 to 0.9, and 0.7 in this embodiment. It is indispensable that the tire is mounted onto a wheel such that the wider tread portion may be positioned on the wheel-mounted outer side.

In FIG. 1, none of a carcass, a breaker, bead cores, etc. are shown, and a rubber boundary between the tread and the side wall is denoted by 9.

In order to confirm the effect of the present invention, the following comparative tests were conducted.

Tires compared were tires having a tire size of 37.25-35 (TRA code L-5). Comparative Tire 1 is a symmetrical tire as shown in FIG. 2 in which right and left side tread portions are both designed to have the narrower tread portion in FIG. 1 and $TW_A/TW_O$, $CR_A/CR_O$, and $STD_A/STD_O$ are all one.

Figure 3:
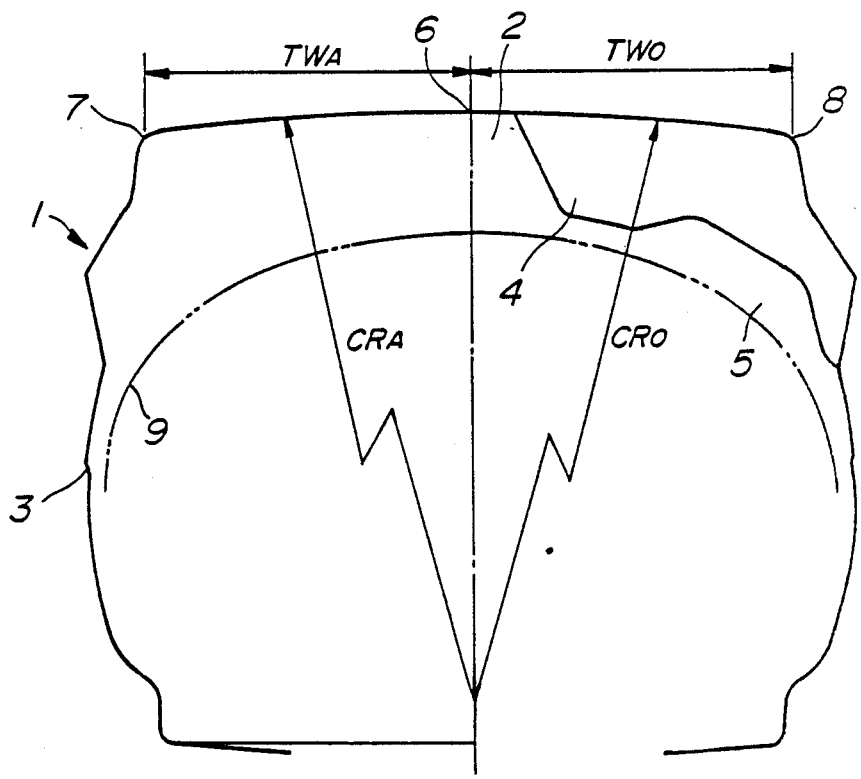
FIG. 3 is a radially sectional view of a prior art semi-slick type wheel loader tire.

Comparative Tire 2 is a semi-slick pattern tire shown in FIG. 3 in which the wheel-mounted inner side on one of the opposite sides of the tire equator is designed to have the same sectional profile as the narrower tread portion in Comparative Tire 1 and no lugs are provided at the wheel-mounted outer side, and $TW_A/TW_O$ and $CR_A/CR_O$ are both one.

Comparative Tire 3 is a slick tire pattern tire having the same sectional profile as in comparative Tire 2, in which no grooves are provided and $TW_A/TW_O$ and $CR_A/CR_O$ are both one. Invention Tire is the tire shown in FIG. 1.

With respect to four kinds of the above-mentioned tires, the block-chipping resistance and the tread traction performance were tested.

These tests were conducted under conditions of a normal internal pressure and a normal load. With respect to the block-chipping resistance, a tire actually mounted on a car was run on a hard and rough road such as a rocky place for 1,000 hours, and then a chipped volume of the block on a half portion of the tire, i.e., the wheel-mounted outer side of the tire was compared. With respect to the traction performance, a tire mounted on a car was run on a relatively soft road such as a common construction work field, and a traction force per tire at a tire running initial stage was measured. A cost was compared with respect to a manufacturing cost of one tire.

Results are all shown in the following Table by index. The larger the index, the more excellent the tire performances. Results of Comparative Tire 1 of FIG. 2 were taken as 100. In Comparative tire 1, almost all lug land portions on a half portion, i.e. the wheel-mounted outer side disappeared after 1,000 hour running, and the traction force was 40 tons at the tire running initial stage.

TABLE 1

|  | Block-chipping resistance | Traction performance | Cost |
| --- | --- | --- | --- |
| Invention tire | 140 | 95 | 93 |
| Comparative tire 1 | 100 | 100 | 100 |
| Comparative tire 2 | 150 | 78 | 88 |
| Comparative tire 3 | 150 | 70 | 78 |

As seen from the above results, according to the present invention, the block-chipping resistance of the wheel loader tire can be improved without largely deteriorating the traction performance. When the tire according to the present invention is used, the running and working are made possible on both different condition roads such as ordinary construction work field and rocky construction work field.

What is claimed is:

1. A heavy duty pneumatic tire comprising; a tire tread surface, wherein a width of a tread portion from a tire equator to one of laterally outer treads edges which tread portion is to be located on a wheel-mounted outer side is lager than that of the other tread portion from the tire equator to the other laterally outer tread edge; said tread having lug grooves on both sides of the tire equator; contours of the outer surface of tread portions in cross section located on opposite sides of the tire equator being approximated by two respective circular arcs, the radius of curvature of the arc corresponding to the wider tread portion being larger than that of the narrower tread portion and a depth of grooves at a shoulder portion on the wider tread portion which depth is expressed by a distance between the laterally outer tread edge and the bottom of the lug groove is smaller than that on the narrower tread portion.

2. A heavy duty pneumatic tire according to claim 1, wherein the width of the wider tread portion is not less than 1.05 times that of the narrower tread portion.

3. A heavy duty pneumatic tire according to claim 1, wherein the radius of curvature of the arc corresponding to the wider tread portion is not less than 1.2 times that of the narrower tread portion.

4. A heavy duty pneumatic tire according to claim 1, wherein the depth of the shoulder grooves of the wider tread portion is 0.5 to 0.9 times that of the narrower tread portion.

* * * * *